United States Patent
Freakes (10) Patent No.: US 9,416,483 B1
(45) Date of Patent: Aug. 16, 2016

(54) LAUNDRY MACHINE LEVELING DEVICES

(71) Applicant: Anthony Freakes, Lawrenceville, NJ (US)

(72) Inventor: Anthony Freakes, Lawrenceville, NJ (US)

(*) Notice: Subject to any disclaimer, the term of this patent is extended or adjusted under 35 U.S.C. 154(b) by 0 days.

(21) Appl. No.: 14/061,800

(22) Filed: Oct. 24, 2013

Related U.S. Application Data (60) Provisional application No. 61/717,815, filed on Oct. 24, 2012.

(51) Int. Cl.
*D06F 1/00* (2006.01)
*B08B 3/12* (2006.01)
*D06F 39/12* (2006.01)
*F16M 11/24* (2006.01)

(52) U.S. Cl.
CPC .............. *D06F 39/125* (2013.01); *F16M 11/24* (2013.01)

(58) Field of Classification Search
CPC .......... A47B 91/00; A47B 91/10; F16M 7/00; D06F 39/125; A61B 5/221; C08L 27/06; C08L 89/06
USPC ............ 248/677, 638, 615, 562, 346.11, 188, 248/188.1, 188.2, 188.3, 188.4, 188.8; D32/16, 60, 73
See application file for complete search history.

(56) References Cited

U.S. PATENT DOCUMENTS

| | | | | |
|---|---|---|---|---|
| 1,810,971 A * | 6/1931 | Lee | ............................. | 248/188.4 |
| 3,868,079 A * | 2/1975 | Johnson | ............... | A47B 91/024 248/188.4 |
| 4,462,225 A * | 7/1984 | Noe | ....................... | D06F 39/125 248/121 |
| 5,332,182 A * | 7/1994 | Weisz | .................. | G01G 23/002 348/188.4 |
| 5,749,550 A * | 5/1998 | Jackson | ............... | A47B 91/022 248/188.2 |
| 5,971,350 A * | 10/1999 | McCutcheon | ....... | A47B 91/028 248/188.2 |
| 6,186,463 B1 * | 2/2001 | Williams | ................... | G09F 7/18 248/413 |
| 7,178,768 B2 * | 2/2007 | Inoue | ....................... | F16M 7/00 248/188.4 |
| 7,686,263 B2 * | 3/2010 | Inoue | ................... | A47B 91/022 248/188.2 |
| 7,942,101 B2 * | 5/2011 | Conley | ..................... | A47B 9/16 108/10 |
| 8,220,760 B2 * | 7/2012 | Fetzer | .................. | A47B 91/028 248/188.2 |
| 2002/0139909 A1 * | 10/2002 | Oyama | .................. | A47B 91/02 248/188.8 |
| 2003/0136887 A1 * | 7/2003 | Gabriel | ............... | A47L 15/4253 248/188.2 |
| 2003/0173475 A1 * | 9/2003 | Hsieh | ..................... | F16M 11/18 248/161 |
| 2005/0081577 A1 * | 4/2005 | Song | ..................... | D06F 39/125 68/23.1 |
| 2007/0023591 A1 * | 2/2007 | Kwon | .................... | D06F 39/125 248/188.3 |
| 2007/0205342 A1 * | 9/2007 | Gabriel | ..................... | F16M 7/00 248/188.4 |
| 2008/0028803 A1 * | 2/2008 | Lee | ....................... | D06F 39/125 68/23.1 |
| 2008/0087777 A1 * | 4/2008 | Christian | ................ | A47B 91/00 248/188.8 |
| 2009/0032654 A1 * | 2/2009 | Tseng | ...................... | F16M 7/00 248/188.4 |
| 2010/0276564 A1 * | 11/2010 | Fetzer | ................... | A47B 91/028 248/678 |
| 2012/0241568 A1 * | 9/2012 | Christian | ............... | A47B 91/02 248/188.3 |
| 2013/0156497 A1 * | 6/2013 | Haider | ................. | A47B 91/022 403/343 |

* cited by examiner

*Primary Examiner* — Jonathan Liu
*Assistant Examiner* — Muhammad Ijaz
(74) *Attorney, Agent, or Firm* — Timothy X. Gibson, Esq.; Gibson & Dernier LLP (57) ABSTRACT

Laundry machine leveling devices for a laundry machine are disclosed which employ a screw arrangement having left and right hand threads engaged with a foot arranged such that the machine, the floor, and the foot in contact with the floor does not turn. Using the friction between an elastomeric foot element and the floor permits adjustment of devices disclosed herein.

5 Claims, 13 Drawing Sheets

LAUNDRY MACHINE LEVELING DEVICES

CROSS-REFERENCE TO RELATED APPLICATIONS

This application claims the benefit of U.S. Provisional Patent Application Ser. No. 61/717,815 filed Oct. 24, 2012, the entirety of which is incorporated by reference herein.

FIELD OF THE INVENTION

The invention relates to the field of laundry machine leveling devices. More specifically, it relates to adjustable feet for laundry machines.

BACKGROUND OF THE INVENTION

Automatic laundry cleaning and drying is done by washing machines and dryers. These machines are a well known part of life, and the majority of dwellings in the USA have such machines nearby. It is well known that part of their operating cycle involves spinning and tumbling. Spinning, as the term suggests, revolves the basket or drum containing the clothes at a high speed to employ centrifugal force to extract the water from the clothing. Tumbling revolves the clothing containing drum at a slower speed to allow the clothing to fall and cascade through the hot air flow of the drying machine. Both of these operations cause unbalanced forces to be transmitted to the outer framework of the machines. In the case of the spinning of the washing machine, the vibration can cause an alarming and disturbing noise and even make the entire machine move, or "walk", from its installed position.

Machine designers have attempted to arrange for absorption and/or counteraction of these unbalanced forces both internally and externally in an effort to mitigate the obvious problem. External absorption devices are employed in the mounting feet of the machine. Several designs are used and usually involve a rubber pad in contact with the floor. As the floor is not perfectly flat, it is a common practice to use four feet, with at least one foot being adjustable so that all four feet equally support the weight of the machine. Most current designs of the adjustable feet use the simple idea of having an internal thread rigidly fixed to the base of the machine and a mating externally threaded stem with a rubber pad contained in a cup at one end of the threaded stem.

When the machine is installed and located in its final position, the levelness and the equality of support between the four feet is established by turning the adjustable stem. In practice, there are two problems which arise, both of which can lead to destruction of the foot's essential vibration-absorbing rubber pad. First, during installation, the machines are dragged and pushed across a floor. The floor can be tiled, linoleum, steel, plain rough concrete or any other floor material which might be at the installation site. The weight of the machine and the friction between the rubber pad and the floor determine the transverse load felt by the entire foot assembly. This load can be high enough to bend the foot assembly and even if that extreme is not reached, it can be high enough to abrade the rubber and/or cause it to split and be destroyed to the extent that it cannot perform its function.

Second, after installation, it is necessary to adjust the feet, and in turning the adjustable feet the rubber is forced to turn against the high pressure and friction between the rubber surface and the floor. This puts extreme stress on the rubber features which serve to retain the rubber in its cup. If these features fail and crumble, then upon subsequent movement of the machine, say to another location or simply for repair, the rubber can fall out, and the machine loses its ability to be easily leveled. Thus there is a need for a device which solves the aforementioned problems.

Moreover, it often happens that owners of a laundry machine do not adjust the adjustable feet prior to installation, and/or simply try to level the machine to reduce vibration using a shim of some kind, such as cardboard or the like. The laundry machine owner may not make the proper adjustment because they do not know the feet can be adjusted or because the feet may be difficult to adjust once the machine is set up. Often it is the case the proper tool is not available to make the adjustment. Thus there is a need for a device to snub out the vibration, without requiring tools.

SUMMARY OF THE INVENTION

The presently disclosed subject matter solves the aforementioned problems by providing and employing features which allow robust mounting of the feet prior to installation and allow leveling adjustment of the feet without turning the rubber pad. Devices disclosed herein permit the withdrawal of stems to a compact position which minimizes potential damage to the leveling feet.

In accordance with one embodiment a leveling device for a laundry machine is provided which employs a screw thread and a foot which is arranged such that the machine, the floor, and the foot in contact with the floor does not turn. Using the friction between a rubber foot element and the floor permits adjustment of devices disclosed herein using left and right hand threads.

In one aspect, a turning part is provided which has both a "right hand" and a "left hand" screw thread. One skilled in the art will recognize that moving the turning part in one direction increases the distance between the machine and the leveling foot and turning it in the other direction reduces this distance.

In accordance with another embodiment, a leveling device with an adjustment device is disclosed. Leveling apparatus are disclosed in the accompanying drawings and description.

In accordance with one embodiment, an adjustable laundry machine leveling device for mounting on a laundry machine is disclosed having a dual threaded element having a first threaded element extending in a first direction and including threads formed thereon oriented in a first direction, and a second threaded element extending in a substantially opposite direction, including threads formed thereon oriented in the opposite direction as that of the first threaded element, a foot extending from the second male threaded element, the foot including a foot pad extending therefrom at a side of the foot distal to the first male threaded element, and a female threaded element corresponding to and threadably engageable to the first threaded element, wherein the female threaded element is operable to be fixed to the bottom deck of the laundry machine, wherein the dual threaded element is operable to rotate in a first direction which rotation increases the distance of the female element from the foot, and the dual threaded element is operable to rotate in a second, opposite direction to decrease the distance of the female element from the foot, wherein when a rotational force is applied to the dual threaded element the female element remains fixed and the foot and foot pad are operable to remain stationary due to frictional engagement of the foot pad and a floor upon which the laundry machine is disposed.

In another embodiment, a laundry machine leveling device for mounting on a bottom deck of a laundry machine includes a first male threaded element having a first and second end and threads formed in one direction, and a head fixed at the first end thereof, wherein the head is operable to be fixed to a surface of the bottom deck of the laundry machine, a second male threaded element having a first and second end and threads formed in the opposite direction as that of the first threaded element, and a foot fixed at the first end of the second male threaded element, the foot including a foot pad extending therefrom at a side of the foot distal to the second end of the second male threaded element, and a turnbuckle having a first and second end and a bore comprising internal threads at the first end corresponding to the threads of the first male threaded element and including internal threads at the second end corresponding to the threads of the second male threaded element, such that the first and second male threaded elements may be threadably engaged to the turnbuckle so that the head and foot are disposed at opposite ends of the turnbuckle, wherein the turnbuckle is operable to rotate in a first direction to move the first and second male threaded elements toward each other, and to rotate in a second, opposite direction to move the first and second male threaded elements away from each other, wherein when a rotational force is applied to the turnbuckle the head does not rotate and the foot and foot pad are operable to remain stationary due to frictional engagement of the foot pad and a floor upon which the laundry machine is disposed. The first male threaded element may include a thread locking pad disposed on the threads. The turnbuckle may include an external surface configured to permit gripping and/or adjustment, such as but not limited to a hexagonal exterior surface. The foot pad may be made of or include an elastomer.

In another embodiment, a laundry machine leveling device for mounting on a bottom deck of a laundry machine includes an adjustable stem including a first male threaded element extending in a first direction and including threads formed thereon oriented in a first direction and a second male threaded element extending in a substantially opposite direction, including threads formed thereon oriented in the opposite direction as that of the first threaded element, a foot threadably engageable to the second male threaded element, the foot including a foot pad extending therefrom at a side of the foot distal to the first male threaded element, and a female element threadably engageable to the first male threaded element, wherein the female element is operable to be fixed to the bottom deck of the laundry machine, wherein the stem is operable to rotate in a first direction which rotation increases the distance of the female element from the foot, and the stem is operable to rotate in a second, opposite direction to decrease the distance of the female element from the foot, wherein when a rotational force is applied to the stem the female element remains fixed and the foot and foot pad are operable to remain stationary due to frictional engagement of the foot pad and a floor upon which the laundry machine is disposed. The female element may be a nut such as but not limited to a rivnut. The stem may include an external surface configured to permit gripping and/or adjustment, such as a hexagonal exterior surface. The foot pad may be or include an elastomer.

In accordance with still a further embodiment, a laundry machine leveling device for mounting on a bottom deck of a laundry machine includes a male element including a first end including a first threaded section with threads formed in a first direction, a second end opposite the first end including a head operable to be engaged by an adjustment tool, and a second threaded section disposed between the first threaded section and the head, the second threaded section including threads formed in a direction opposite the first threaded section, a female element operable to be fixed to the bottom deck of the laundry machine and threadably engageable with the second threaded section, a foot threadably engageable with the first threaded section, the foot including a foot pad extending therefrom at a side of the foot distal to the head, wherein the head is operable to rotate in a first direction which rotation increases the distance of the female element from the foot, and the head is operable to rotate in a second, opposite direction to decrease the distance of the female element from the foot, wherein when a rotational force is applied to the head the female element remains fixed and the foot and foot pad are operable to remain stationary due to frictional engagement of the foot pad and a floor upon which the laundry machine is disposed. The female element may be a nut such as but not limited to a rivnut. The head may include an external surface configured to permit gripping and/or adjustment, and may include an external surface operable to be engaged by an adjustment tool such as a wrench, pliers, screwdriver or the like. The foot pad may be or include an elastomer.

In accordance with yet a further embodiment, a laundry machine leveling device for mounting on a laundry machine includes a foot block including a floor contacting foot extending therefrom, the foot block disposed in an aperture formed in a bottom deck of a laundry machine, a leveling lever pivotably engaged at a first end proximate a laundry machine housing wall and engaged at a second end to the foot block, the leveling lever further including a contact surface, and an adjustment knob positionable in an opening formed in a laundry machine housing wall adjacent to the leveling lever contact surface, the adjustment knob including a first end with a surface operable to impinge against the contact surface of the leveling lever and a second end having a head operable to be manipulated by a user, wherein movement of the head in a first direction is operable to apply pressure on the contact surface of the leveling lever and advance the foot block in the direction of a floor upon which the laundry machine is disposed, and movement of the head in a second, opposite direction is operable to relieve pressure on the contact surface such that the foot block is moved in the opposite direction. The adjustment knob may include a male threaded element wherein the adjustment knob is rotatably movable to advance the male threaded element toward the leveling lever contact surface. The laundry machine leveling device may include an anchor block fixable to a wall of a laundry machine, and the leveling lever may be pivotably linked to the anchor block. The device may further include a parallelism-maintaining link operably connected at a first end to the foot block and operably connected at a second end to an anchor block fixed to a wall of a laundry machine. The foot pad may be or include an elastomer.

In another embodiment, disclosed is a laundry machine comprising an adjustable laundry machine leveling device.

Given above is a simplified summary in order to provide a basic understanding of some aspects described herein. This summary is not an extensive overview, and is not intended to identify key/critical elements or to delineate the scope of the claimed subject matter.

BRIEF DESCRIPTION OF THE DRAWINGS

So that those having ordinary skill in the art will have a better understanding of how to make and use the disclosed systems and methods, reference is made to the accompanying figure wherein.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
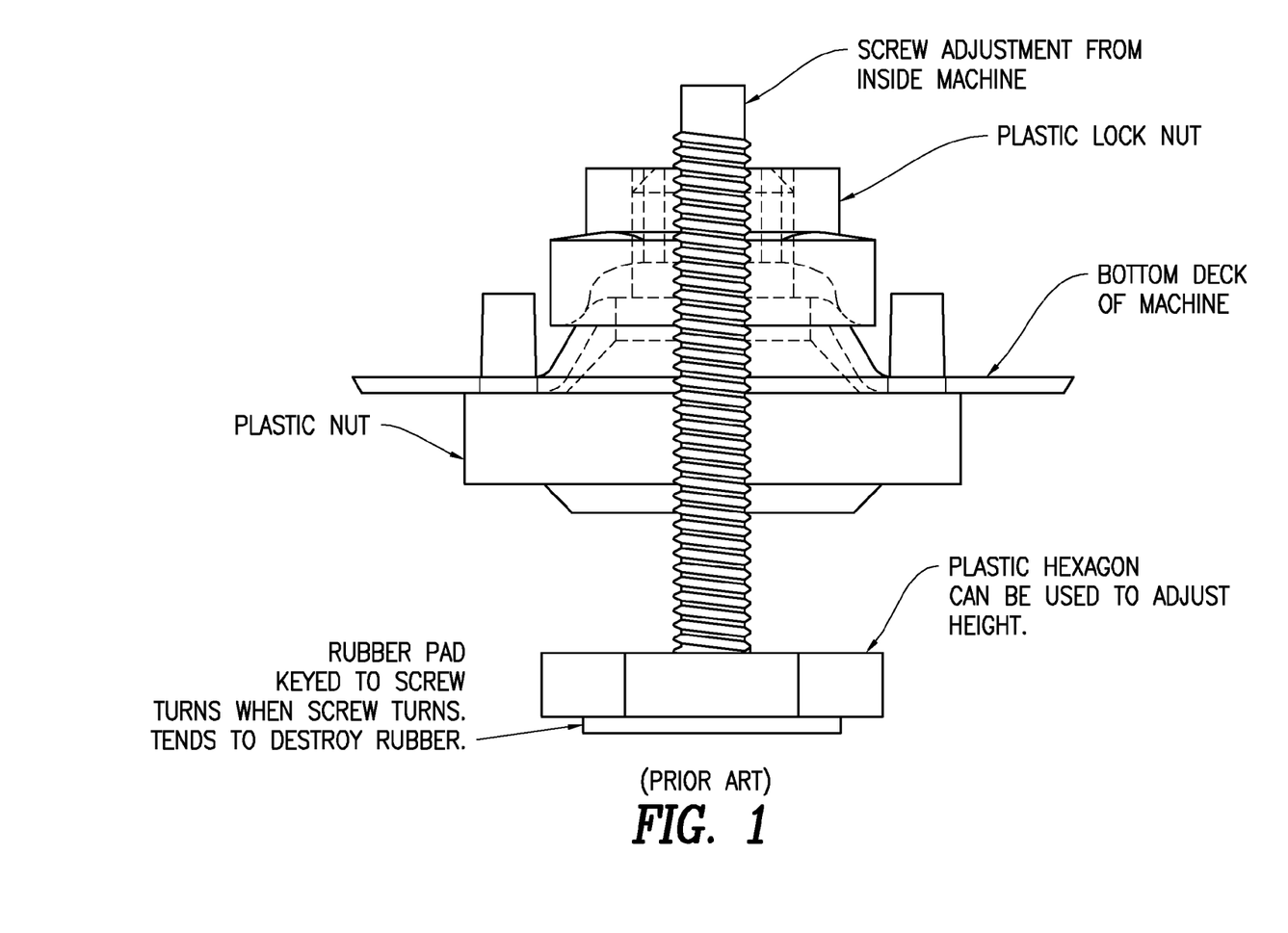
FIG. 1 is a side view of a prior art leveling foot.

FIG. 1 depicts a prior art device.

Figure 2:
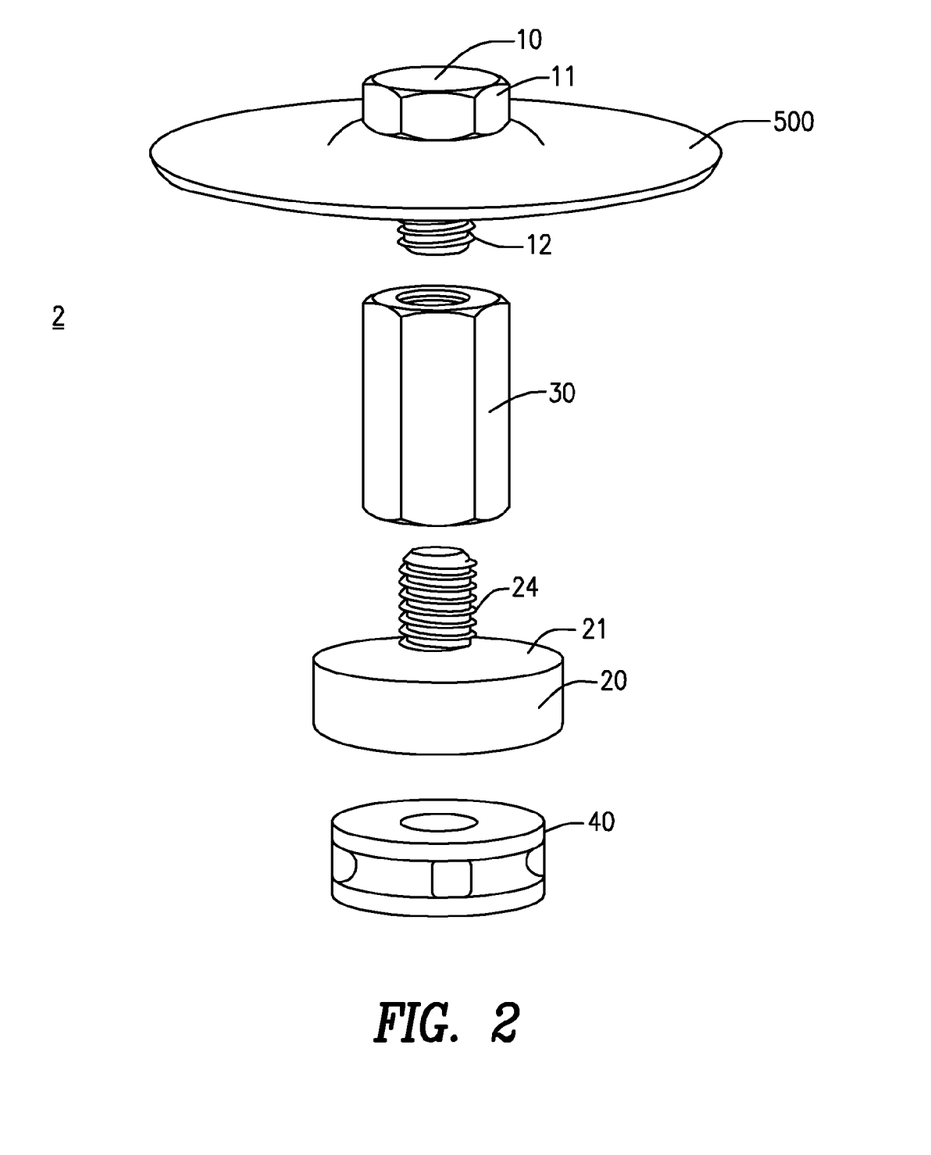
FIG. 2 is an exploded view of a device in accordance with one embodiment of the disclosed subject matter.
Figure 2A:
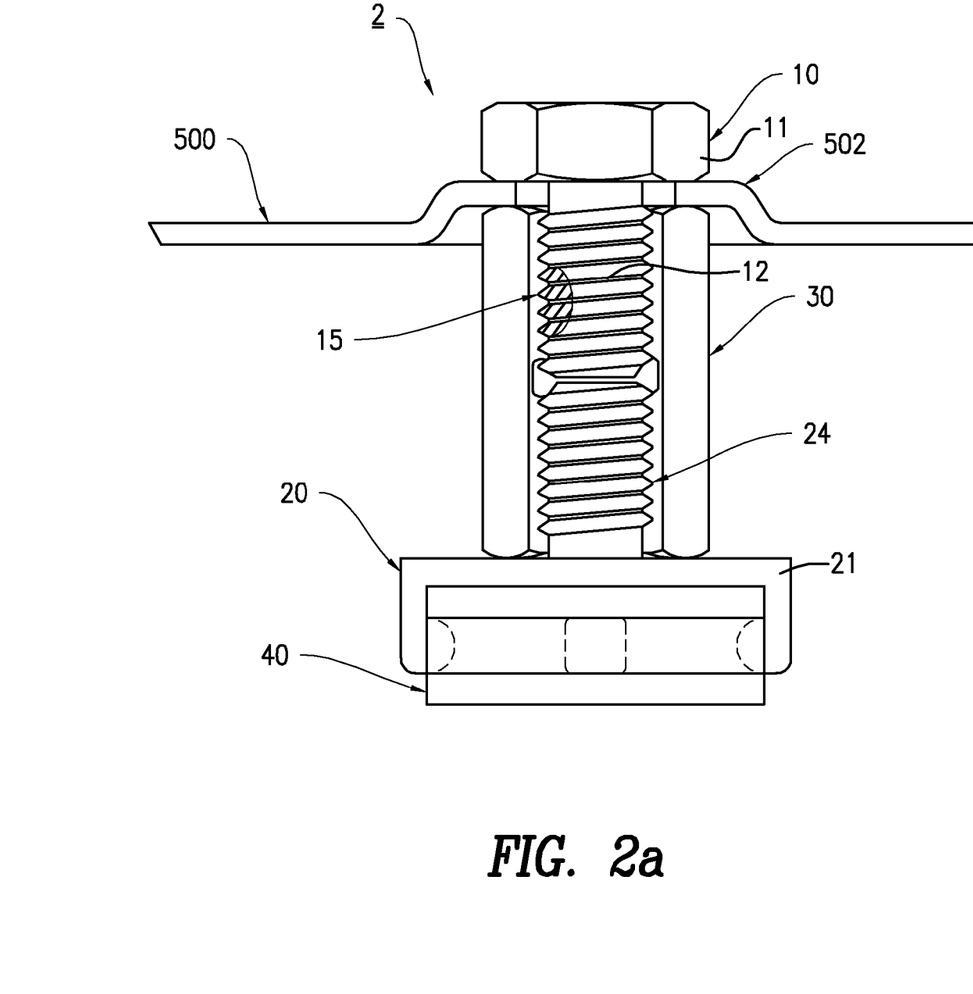
FIG. 2a is a side cross-sectional view of a device in accordance with FIG. 2, showing a combination of threaded elements with left and right hand threads and a turnbuckle, in a condition wherein the arrangement is tightly fixed to the base of the laundry machine so that it is rigid during machine dragging, in accordance with one embodiment of the disclosed subject matter.
Figure 2B:
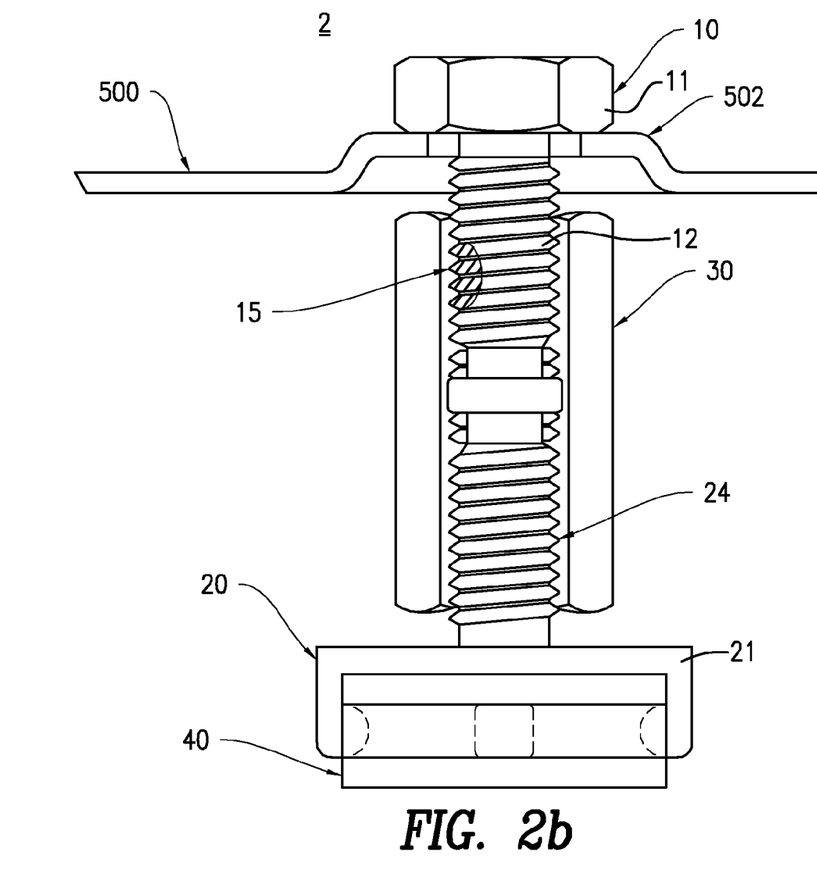
FIG. 2b is a side cross-sectional view of the embodiment of FIG. 2a, but shown in an adjusted position, in accordance with one embodiment of the disclosed subject matter.

Now referring to FIGS. 2, 2a and 2b, a laundry machine leveling device 2 is depicted for mounting on a bottom deck 500 of a laundry machine. The leveling device 2 includes a first male threaded element having threads 12 in one direction, such as a right hand screw or bolt, and a head 11 fixed at one end thereof, a thread locking pad 15, a second male threaded element 20 having threads 24 in the opposite direction as that of the first threaded element 12, such as a left hand screw or bolt, and a foot 21 at one end thereof, and a turnbuckle 30 with left and right hand threads connecting the first and second male threaded elements 10 and 20 so that the head 11 and foot 21 are disposed at opposite ends of the turnbuckle 30. The turnbuckle 30 may include external features to permit gripping and adjustment such as with a wrench. For example the turnbuckle 30 may have a hexagonal exterior surface. The head 11 is operable to be fixed to a surface of the bottom deck 500 of the laundry machine so that it will not rotate when a rotational force is applied to the turnbuckle 30. The foot 21 further includes a foot pad 40 of resilient material such as an elastomer. The foot pad 40 is operable to contact the floor and is preferably is a material that will provide high friction and good grip, such as rubber. As the turnbuckle 30 is rotated in one direction, the first and second male threaded elements 10 and 20 are moved apart from each other, while the foot 21 and foot pad 40 are prevented from turning by the high frictional engagement of the foot pad 40 and the floor. Rotation of the turnbuckle 30 in the opposite direction advances the foot 21 and head 11 toward each other. Thread locking pad 15 may be a nylon pad or patch commonly applied to machine screws, available for example from McMaster-Carr of Robbinsville, N.J.

Figure 3:
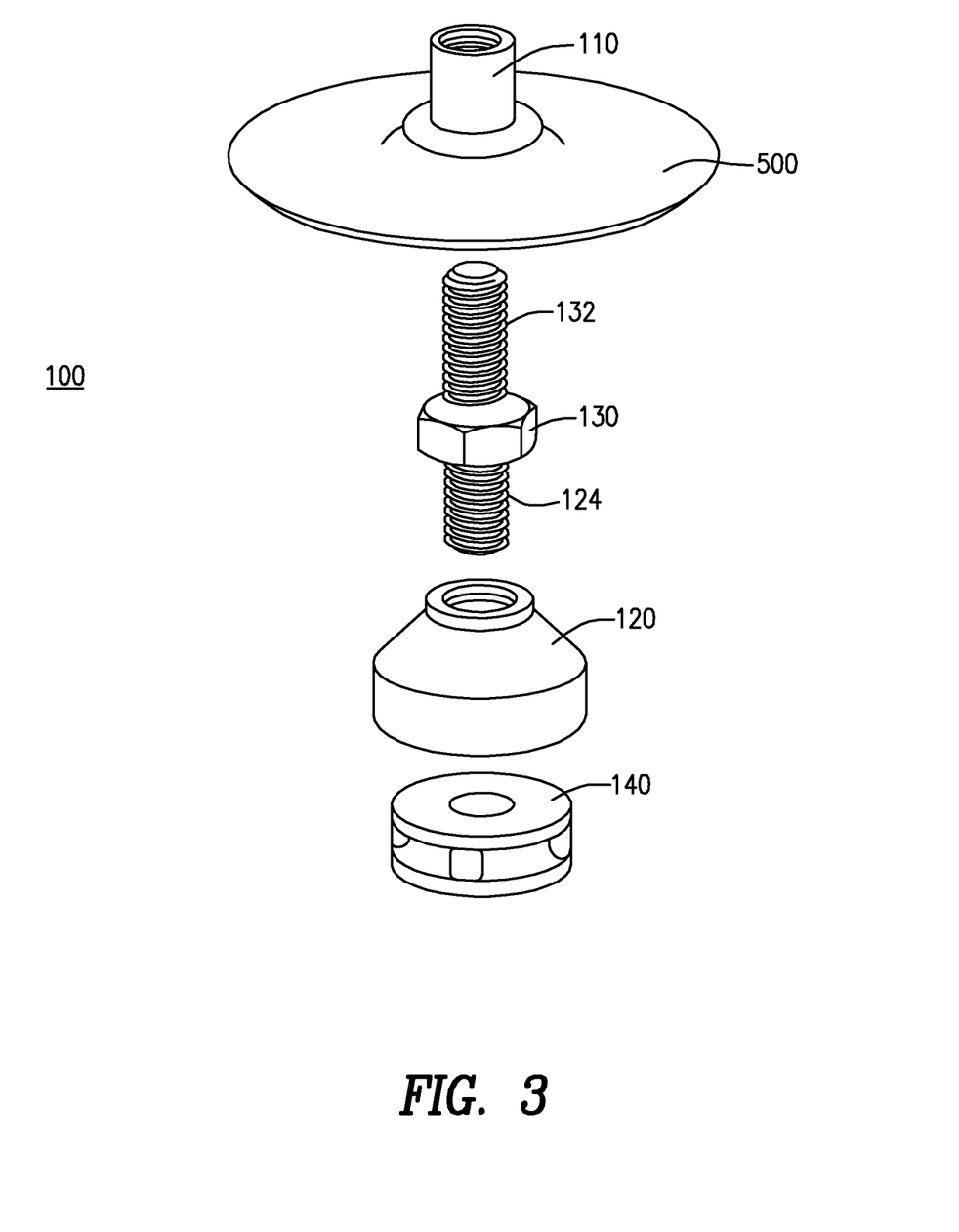
FIG. 3 is an exploded view of a device in accordance with one embodiment of the disclosed subject matter.
Figure 3A:
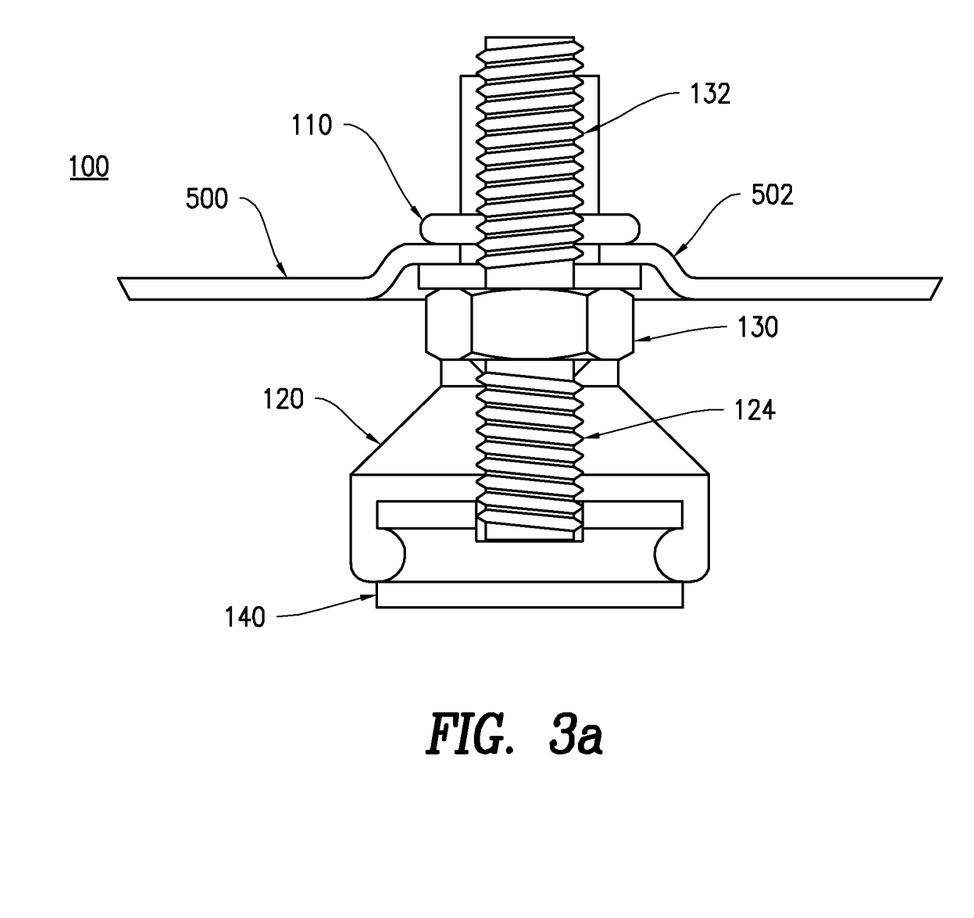
FIG. 3a is a side cross-sectional view of a device in accordance with FIG. 3, depicting an adjusting element, wherein the device is operable to be adjusted from outside a laundry machine frame or housing, wherein the arrangement is tightly fixed to the base of the laundry machine so that it is rigid during machine dragging, in accordance with one embodiment of the disclosed subject matter.
Figure 3B:
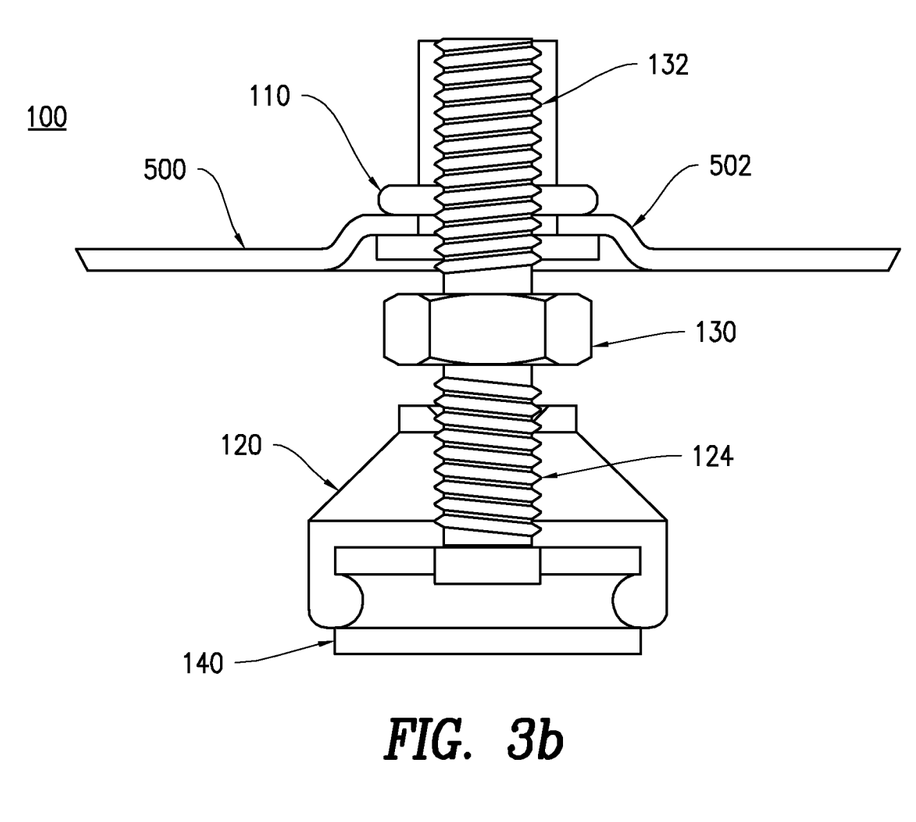
FIG. 3b is a side cross-sectional view of the embodiment of FIG. 3a, but shown in an adjusted position, in accordance with one embodiment of the disclosed subject matter.

Now referring to FIGS. 3, 3a and 3b, in another embodiment a laundry machine leveling device 100 includes an adjustable stem 130 having a first male threaded element 132 extending therefrom in a first direction and having threads in one direction, such as a right hand screw or bolt, and a second male threaded element 124 extending from the stem 130 in a substantially opposite direction, having threads in the opposite direction as that of the first threaded element 132, such as a left hand screw or bolt, a foot 120 threadably engageable to the second male threaded element 124, and a nut 110 such as a rivnut threadably engageable to the first male threaded element, wherein the nut 110 is operable to be fixed to the bottom deck 500 of a laundry machine. The stem 130 may include external features to permit gripping and adjustment such as with a wrench. For example the stem 130 may have a hexagonal exterior surface. The foot 120 further includes a foot pad 140 of resilient material such as an elastomer. The foot pad 140 is operable to contact the floor and is preferably is a material that will provide high friction and good grip, such as rubber. As the stem 130 is rotated in one direction, the nut 110 and hence the deck 500 of the machine and the foot pad 140 are separated from each other. Rotation of the stem 130 in the opposite direction advances the foot 120 and nut 110 toward each other. The foot 120 and foot pad 140 are prevented from turning by the high frictional engagement of the foot pad 140 and the floor.

Figure 4:
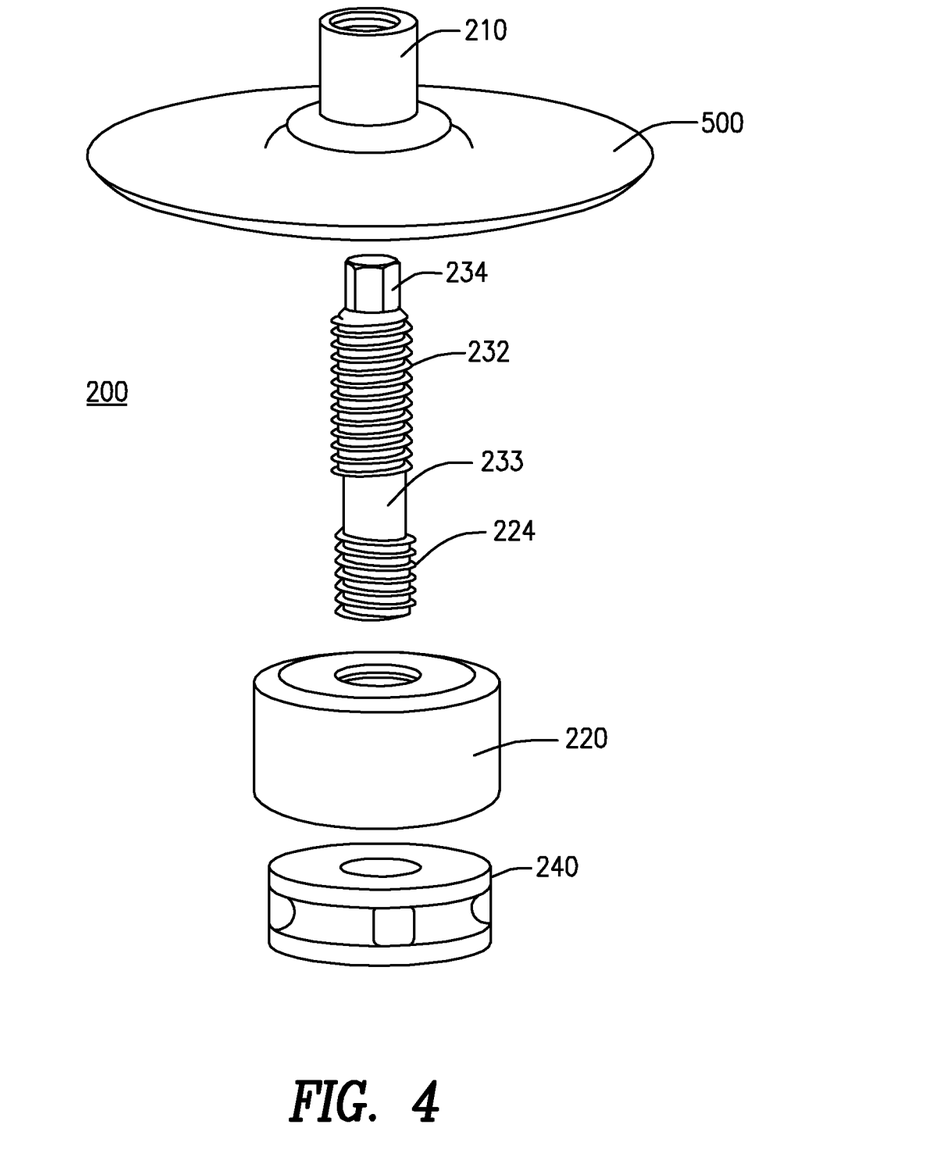
FIG. 4 is an exploded view of a device in accordance with one embodiment of the disclosed subject matter.
Figure 4A:
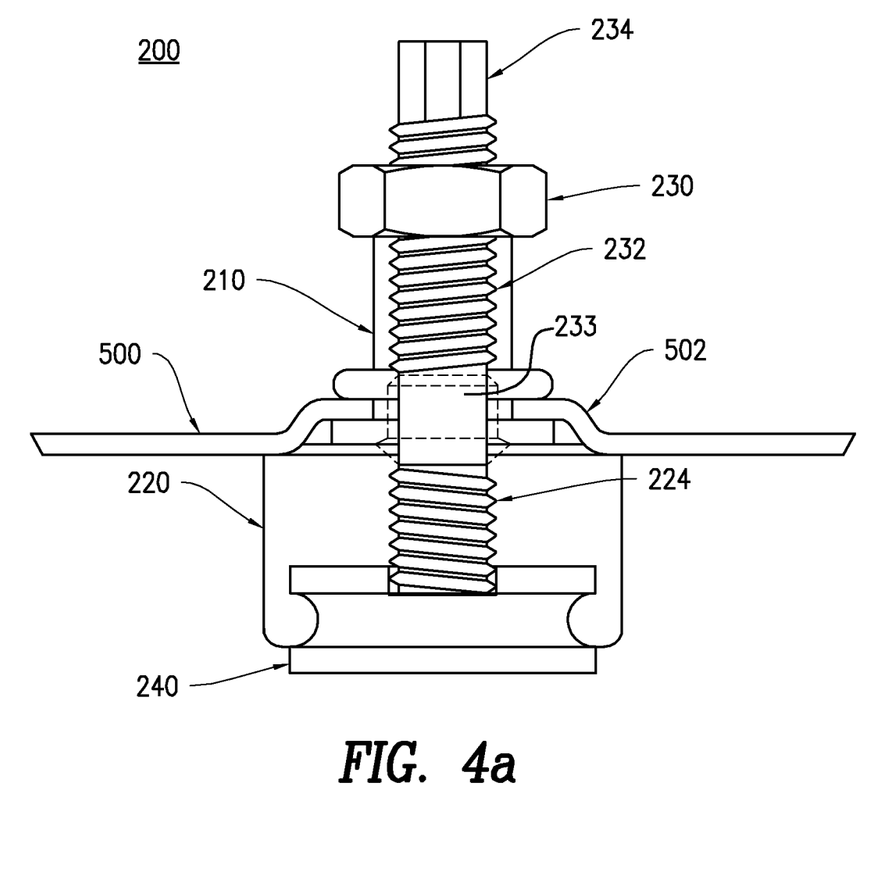
FIG. 4a is a side cross-sectional view of a device adjustable from inside a laundry machine frame or housing, wherein the arrangement is tightly fixed to the base of the laundry machine so that it is rigid during machine dragging, in accordance with one embodiment of the disclosed subject matter.
Figure 4B:
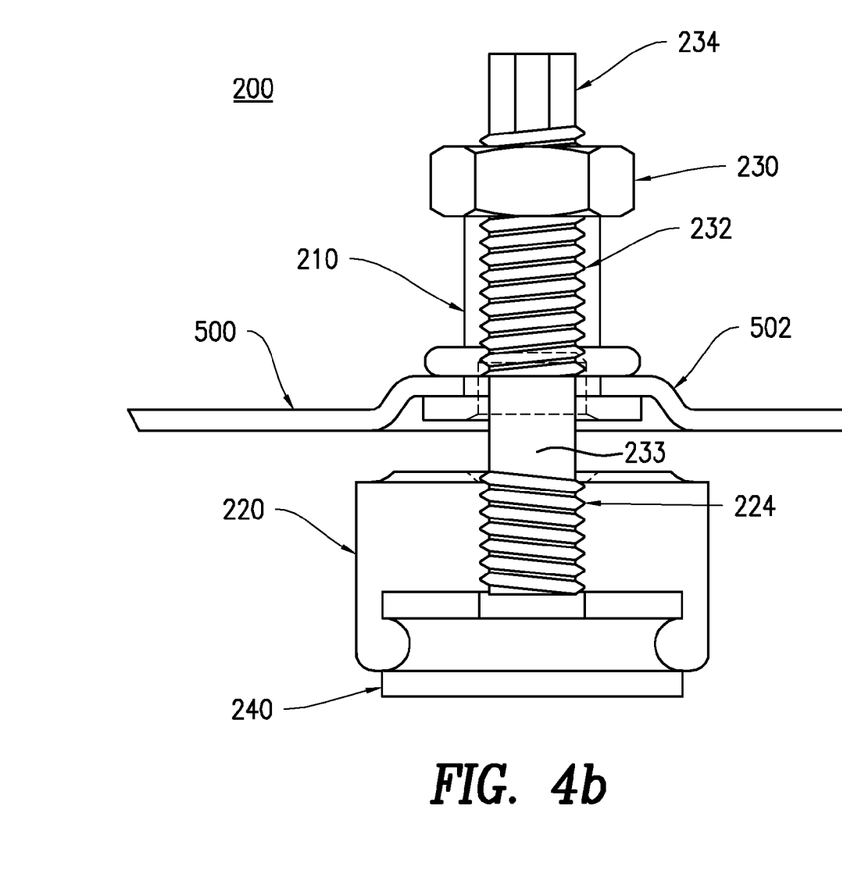
FIG. 4b is a side cross-sectional view of the embodiment of FIG. 4a, except it is shown in an adjusted position, in accordance with one embodiment of the disclosed subject matter.

Now referring to FIGS. 4, 4a and 4b, in another embodiment a laundry machine leveling device 200 includes a male element 233 having a first threaded section 224 threaded in a first direction and a second threaded section 232 threaded in a direction opposite the first threaded section 224 and a head 234 operable to be engaged by an adjustment tool such as a wrench, screwdriver or the like. The head 234 may include external features to permit gripping and adjustment such as with a wrench or screwdriver. For example the head 234 may have a hexagonal exterior surface or a slot or Philips-head receiving recess. The second threaded section 232 is threadably engageable with a female element 210 fixed to the bottom deck 500 of a laundry machine. The female element 210 may be a lock nut and/or rivnut for example. As shown in FIGS. 4a and 4b an optional nut 230 may be included in addition to a rivnut 210. The first threaded section 224 is threadably engageable with a foot 220. The foot 220 further includes a foot pad 240 of resilient material such as an elastomer. The foot pad 240 is operable to contact the floor and is preferably is a material that will provide high friction and good grip, such as rubber. As the head 234 is rotated in one direction, the male element 233 is advanced against the female element 210 fixed to the bottom deck 500 of the laundry machine, hence the deck 500 of the machine and the foot pad 240 are separated from each other. Rotation of the head 234 in the opposite direction advances the foot 220 and bottom deck 500 of the machine toward each other. The foot 220 and foot pad 240 are prevented from turning by the high frictional engagement of the foot pad 240 and the floor.

In practice, the disclosed leveling devices may be employed, one at each corner of a bottom surface of a laundry machine. In this way the height of each corner of a laundry machine may be adjusted.

In accordance with another embodiment, a system is disclosed for a laundry machine having four feet, one at each corner, wherein three of the feet of a laundry machine are fixed and the remaining foot is adjustable. The system is suitable for leveling a laundry machine in most situations, given that most floors are level enough that an adjustment of no more than a quarter of an inch would be sufficient. In one embodiment there is a foot fixed at the rear left, one fixed at the rear right, one fixed at the front left and one adjustable at the front right. It will be apparent to those skilled in the art that the adjustable foot may be located at any corner of the laundry machine, and that plural adjustable feet may be employed.

In one embodiment a laundry machine leveling device including an adjusting knob is disclosed which is readily accessible to a user of the washing machine. Now referring to FIGS. 5, 5a and 5b, an adjustable leveling device 300 for a laundry machine includes a movable foot block 350, a floor contacting foot 340, a leveling lever 330, an anchor block 320 fixable to a wall 504 of a laundry machine, and an adjusting knob 310. The adjusting knob 310 may include a threaded element 312 such as a screw or bolt with a head 313 fixed thereto at one end to facilitate comfortable adjustment by simple manual twisting. The axis of the adjusting knob 310 is preferably arranged horizontally and substantially parallel with a floor upon which the laundry machine is positioned and substantially perpendicular to a wall 504 of the laundry machine. The head 313 of the adjusting knob 310 may be oriented on a front, side or rear of the laundry machine, depending on the location of the adjustable leveling device 300. In one embodiment the knob 310 is located at the front of the machine so it faces the person doing the adjusting, who is at the front of the machine. The working end of the threaded element 312 (opposite the head 313) may include a surface which is operable to impinge against a contact surface 336 of the leveling lever 330 which is linked at one end to the foot block 350 and on another end to the anchor block 320 via connections 332 and 334, so that the turning of the adjusting knob 310 moves the foot 340 up or down as needed. The anchor block 320 may be securely fixable to the laundry machine, such as by welding, machine screws or the like, and may also serve as an anchor for an optional parallelism-maintaining link 360 operably connected to the foot block 350 via connections 362, 364. Connections 332, 334, 362 and 364 may be pins, bolts or the like. The foot block 350 protrudes through an opening formed in the base 500 of the laundry machine to contact the floor 600 and includes the floor-contacting foot 340, which is preferably a high friction material such as rubber for example.

Figure 5:
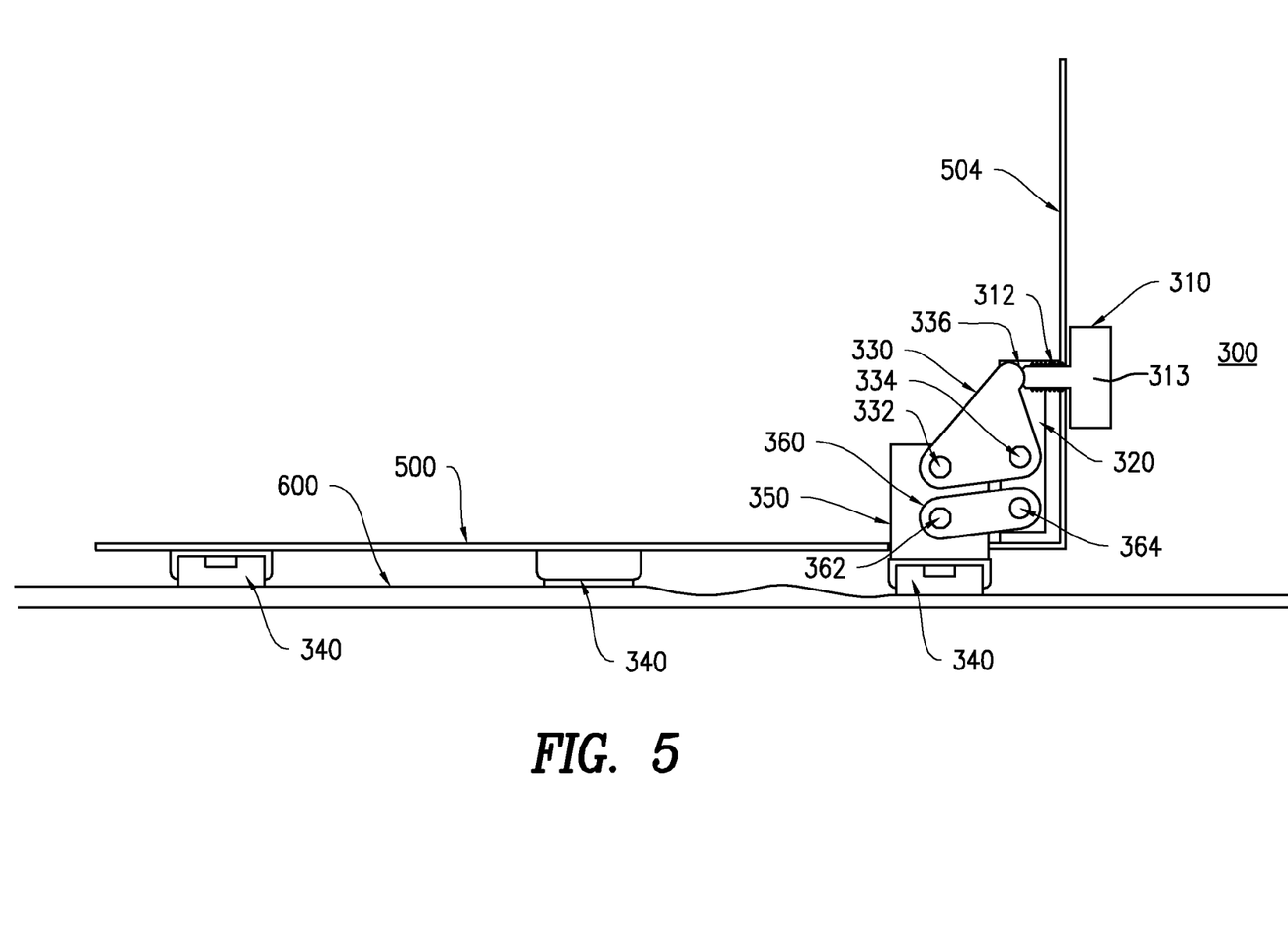
FIG. 5 is a side view of leveling device with a remote adjustment device in accordance with one embodiment of the disclosed subject matter.
Figure 5A:
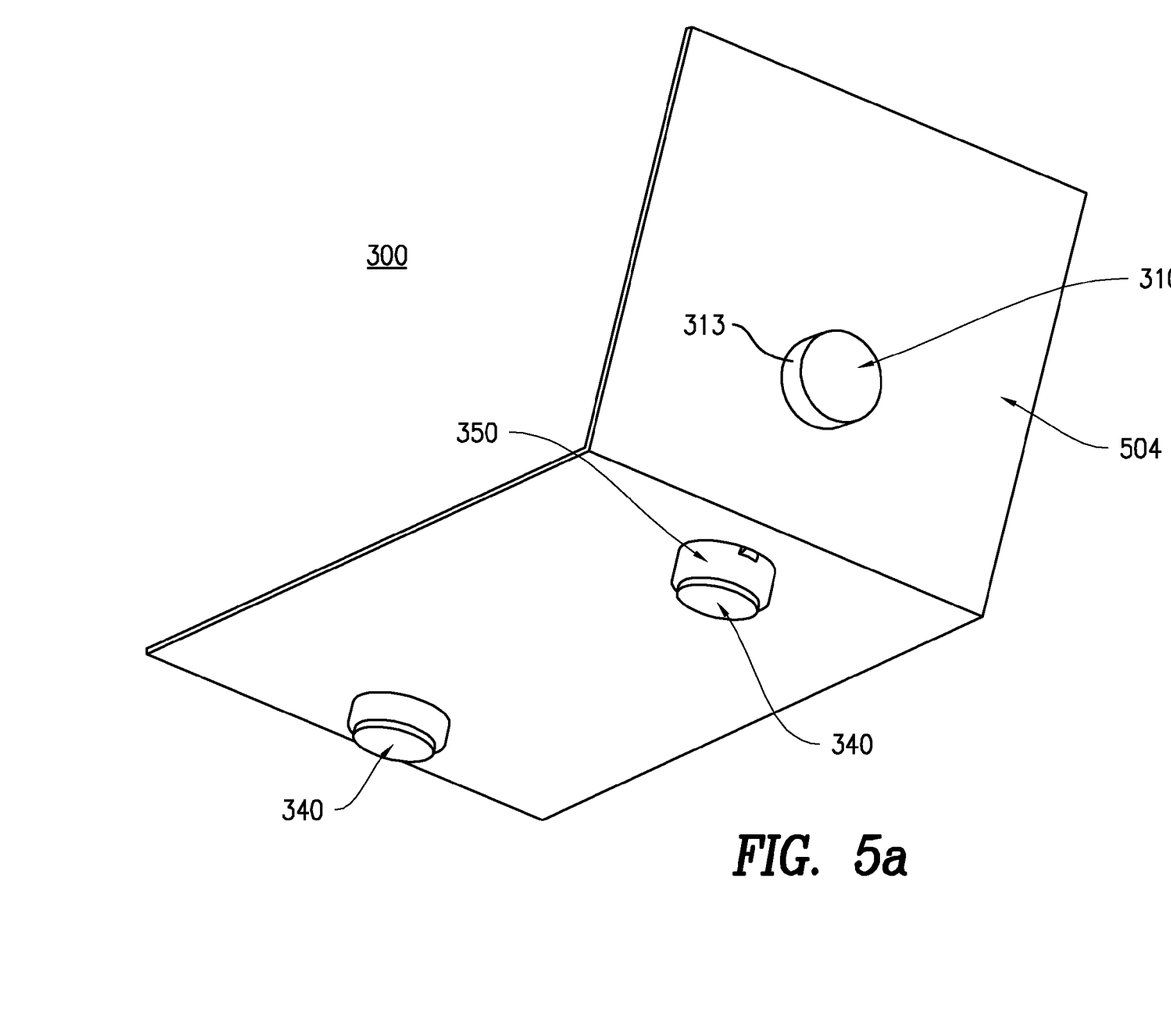
FIG. 5a is a side perspective view of a laundry machine depicting portions of elements present in FIG. 5 in accordance with one embodiment of the disclosed subject matter.
Figure 5B:
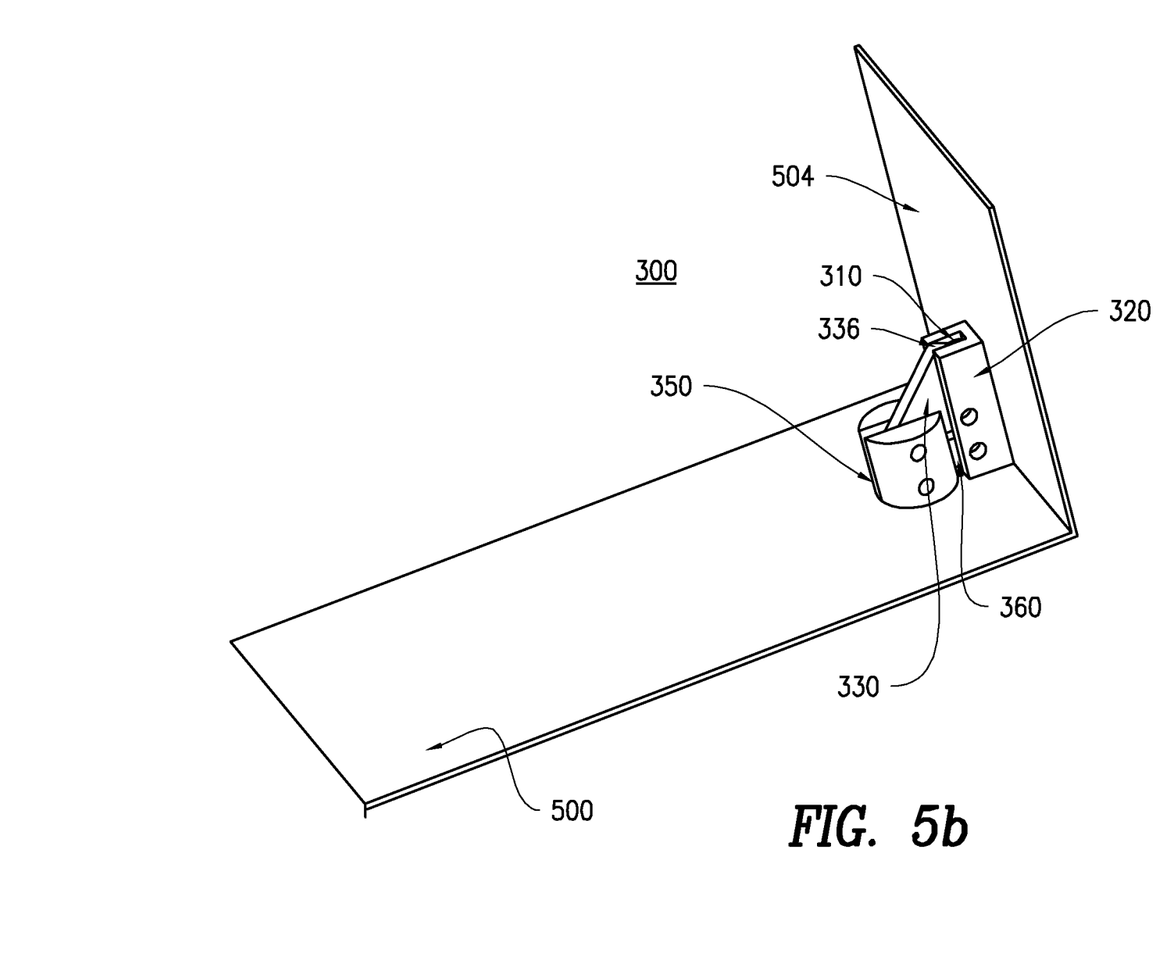
FIG. 5b is an elevated perspective view of a laundry machine depicting portions of elements present in FIG. 5 in accordance with one embodiment of the disclosed subject matter.

By having three of the four feet fixed to the bottom of the laundry machine body, considerable cost savings may be realized as the attachment of the feet may be simply done with fasteners or welding. As the three fixed feet can all contact the floor, even though the floor is not flat, providing the fourth foot is also brought into contact with the floor, adjusting the fourth foot 350 will evenly distribute the forces that the feet must support. In this way the vibration is muffled by the evenly supporting rubber feet 340. Additional feet may be fixed to the bottom surface of the laundry machine.

Accordingly, only one foot need be adjusted, and this adjustment is simply and readily accomplished by a reasonably handy user by turning a hand knob 310. This eliminates the need to provide four feet, each with the means to adjust their contact with the floor. Also it eliminates the need for a special tool to adjust the feet. A further advantage is that when the spin cycle is under way in a washing machine, and the unbalanced clothes start a severe wobble and present a knocking noise associated with an unbalanced load, a person nearby can quickly adjust the "snubbing" knob 310 and find a position where the vibration is minimized.

Although the particular mechanism shown to change the horizontal direction of the primary force, applied by the adjusting knob 310, to a vertical direction is a parallelogram linkage, others may be employed without departing from the spirit and scope of the disclosed subject matter. The parallelogram linkage may be preferred as a low cost simple method. However there are many other mechanisms which can achieve the same result. Among them include, without limitation, bevel gearing, worm and wheel gearing, helical gearing, flexible shafting, and other mechanisms only limited by imagination in how they connect to the foot which must move essentially in a roughly vertical direction. It will be noted that the linkage embodiment depicted moves in a slightly curved line rather than a straight vertical line.

Those skilled in the art will recognize that the remaining three feet may be fixed or adjustable.

Although the apparatus and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A laundry machine comprising: a leveling device mounted thereto, the laundry machine leveling device comprising a foot block comprising a floor contacting foot extending therefrom, the foot block configured to be disposed in an aperture formed in a bottom deck of the laundry machine, an anchor block fixed to a housing wall of the laundry machine, a parallelism-maintaining link operably connected at a first end thereof to the foot block and operably connected at a second end thereof to the anchor block, a leveling lever comprising a first end and a second end wherein the first end of the leveling lever is pivotably coupled to the anchor block and the second end of the leveling lever is pivotably coupled to the foot block, the leveling lever further comprising a contact surface, and an adjustment knob positionable in an opening formed in the housing wall adjacent to the leveling lever contact surface, the adjustment knob comprising a first end comprising a surface operable to impinge against the contact surface of the leveling lever and a second end comprising a head operable to be manipulated by a user, wherein rotation of the head in a first direction is operable to apply pressure on the contact surface of the leveling lever and advance the foot block towards a floor upon which the laundry machine is disposed, and rotation of the head in a second, opposite direction is operable to relieve pressure on the leveling lever contact surface such that the foot block is moved away from the floor.

2. The invention according to claim 1 wherein the adjustment knob comprises a male threaded element wherein the adjustment knob is rotatably movable to advance the male threaded element toward the leveling lever contact surface.

3. The invention according to claim 1 wherein the floor contacting foot comprises an elastomer.

4. The invention according to claim 1 wherein the adjustment knob comprises a section between the first and second ends thereof configured to be positioned in the opening of the housing wall, wherein the housing wall is a front or a side wall of the laundry machine.

5. The invention according to claim 4 wherein the section between the first and second ends thereof is rotatably positionable in the front or side wall of the laundry machine.

\* \* \* \* \*